United States Patent
Elembaby

(10) Patent No.: US 7,086,748 B1
(45) Date of Patent: Aug. 8, 2006

(54) ADAPTABLE LIGHT UNIT FOR CELLULAR PHONES

(76) Inventor: Ismail A Elembaby, 2 Blackpine Ct., Holtsville, NY (US) 11742

(*) Notice: Subject to any disclaimer, the term of this patent is extended or adjusted under 35 U.S.C. 154(b) by 0 days.

(21) Appl. No.: 10/679,895

(22) Filed: Oct. 6, 2003

(51) Int. Cl.
*H04M 1/22* (2006.01)

(52) U.S. Cl. ............ 362/88; 362/253; 362/109

(58) Field of Classification Search ............ 362/86, 362/88, 109, 253, 295, 85
See application file for complete search history.

(56) References Cited

U.S. PATENT DOCUMENTS

| | | | |
|---|---|---|---|
| 6,341,871 B1* | 1/2002 | Angelopoulos | 362/23 |
| 6,386,724 B1* | 5/2002 | Naghi | 362/85 |
| 6,755,549 B1* | 6/2004 | Rogers et al. | 362/88 |
| 2002/0067608 A1* | 6/2002 | Kruse et al. | 362/109 |

* cited by examiner

Primary Examiner—Ali Alavi
(74) Attorney, Agent, or Firm—Michael I Kroll

(57) ABSTRACT

A cellular flashlight including a cellular phone having a housing and a light unit extending from the housing of the cellular phone. The cellular flashlight further includes a power source for providing power to the cellular phone and cellular flashlight. A power switch is connected between the light unit and the power source, wherein the power switch is moveable between a first open position disconnecting the light unit from the power source and a second closed position connecting the power source to the light unit, wherein when the power switch is in the second closed position, the light unit is illuminated to provide light to an area at which the light unit is directed. The cellular phone further includes a power source for providing power to the cellular phone and the cellular flashlight. The cellular flashlight further includes an adaptable flashlight unit installed within a cellular phone and operates off its own battery supply.

3 Claims, 18 Drawing Sheets

ADAPTABLE LIGHT UNIT FOR CELLULAR PHONES

BACKGROUND OF THE INVENTION

1. Field of the Invention

The present relates generally to flashlights and, more specifically, to incorporating the power supply of electronic devices with a lamp and switch whereby the electronic device can be used as a flashlight. The interface to the power supply could be through any of the provided ports as well as direct connection to the battery or an additional battery could be provided to power the lamp. Furthermore, the positioning of the lamp could be anywhere on the device either extending from a component of the device such as the antenna or contained within the housing of the device.

The switch could be a moveable switch from and on/off position or the lamp could be energized by twisting the lamp left and right from a disconnect to connect state or by pressing the lamp while engaged within the socket from a disconnect to connect position.

The port such as the cell phone charger port may be modified to incorporate a contact whereby inserting the lamp connector would power the lamp.

Additionally, the present invention provides for an additional element whereby a port could be provided wherein a lamp and switch having its own self contained power supply could be insertable and removable.

The device of the present invention provides a means of light source to the user for the illumination of dropped items, map reading, road breakdowns, key insertion and an endless array of useful illumination needs.

2. Description of the Prior Art

There are other light units designed for illumination. While these light units may be suitable for the purposes for which they where designed, they would not be as suitable for the purposes of the present invention as heretofore described. It is thus desirable to provide a power supply of electronic devices with a lamp and switch whereby the electronic device can be used as a flashlight. It is further desirable that the interface to the power supply could be through any of the provided ports as well as direct connection to the battery or an additional battery could be provided to power the lamp. Furthermore, the positioning of the lamp could be anywhere on the device either extending from a component of the device such as the antenna or contained within the housing of the device.

SUMMARY OF THE PRESENT INVENTION

A primary object of the present invention is to provide a light unit incorporating the power supply of electronic devices with a lamp and switch whereby the electronic device can be used as a flashlight.

Another object of the present invention is to provide a light unit that the interface to the power supply could be through any of the provided ports as well as direct connection to the battery or an additional battery could be to power the lamp.

Yet another object of the present invention is to provide a light unit that the positioning of the lamp could be anywhere on the device either extending from a component of the device such as the antenna or contained within the housing of the device.

Still yet another object of the present invention is to provide a light unit that the switch could be a movable switch from and on/off position or the lamp could be energized by twisting the lamp left and right from a disconnect to connect state or by pressing the lamp while engaged within the socket from a connect to disconnect position.

Yet another object of the present invention is to provide a light unit that the port such as the cell phone charger port may be modified to incorporate a contact whereby inserting the lamp connector would power the lamp.

Still yet another object of the present invention is to provide a light unit that provides for an additional element whereby a port could be provided wherein a lamp and switch having its own self contained power supply could be insertable and removable.

Still yet another object of the present invention is to provide a light unit that projects a beam of laser light in the direction in which it is pointed.

Additional objects of the present invention will appear as the description proceeds.

The present invention overcomes the shortcomings of the prior art by providing to incorporating the power supply of electronic devices with a lamp and switch whereby the electronic device can be used as a flashlight. The interface to the power supply could be through any of the provided ports as well as direct connection to the battery or an additional battery could be provided to power the lamp. Furthermore, the positioning of the lamp could be anywhere on the device either extending from a component of the device such as the antenna or contained within the housing of the device.

The switch could be a movable switch from and on/off position or the lamp could be energized by twisting the lamp left and right from a disconnect to connect state or by pressing the lamp while engaged within the socket from a connect to disconnect position.

The port such as the cell phone charger port may be modified to incorporate a contact whereby inserting the lamp connector would power the lamp.

Additionally, the present invention provides for an additional element whereby a port could be provided wherein a lamp and switch having its own self contained power supply could be insertable and removable.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

DESCRIPTION OF THE REFERENCED DRAWINGS

In order that the invention may be more fully understood, it will now be described, by way of example, with reference to the accompanying drawing in which.

DESCRIPTION OF THE REFERENCED NUMERALS

Figure 1:
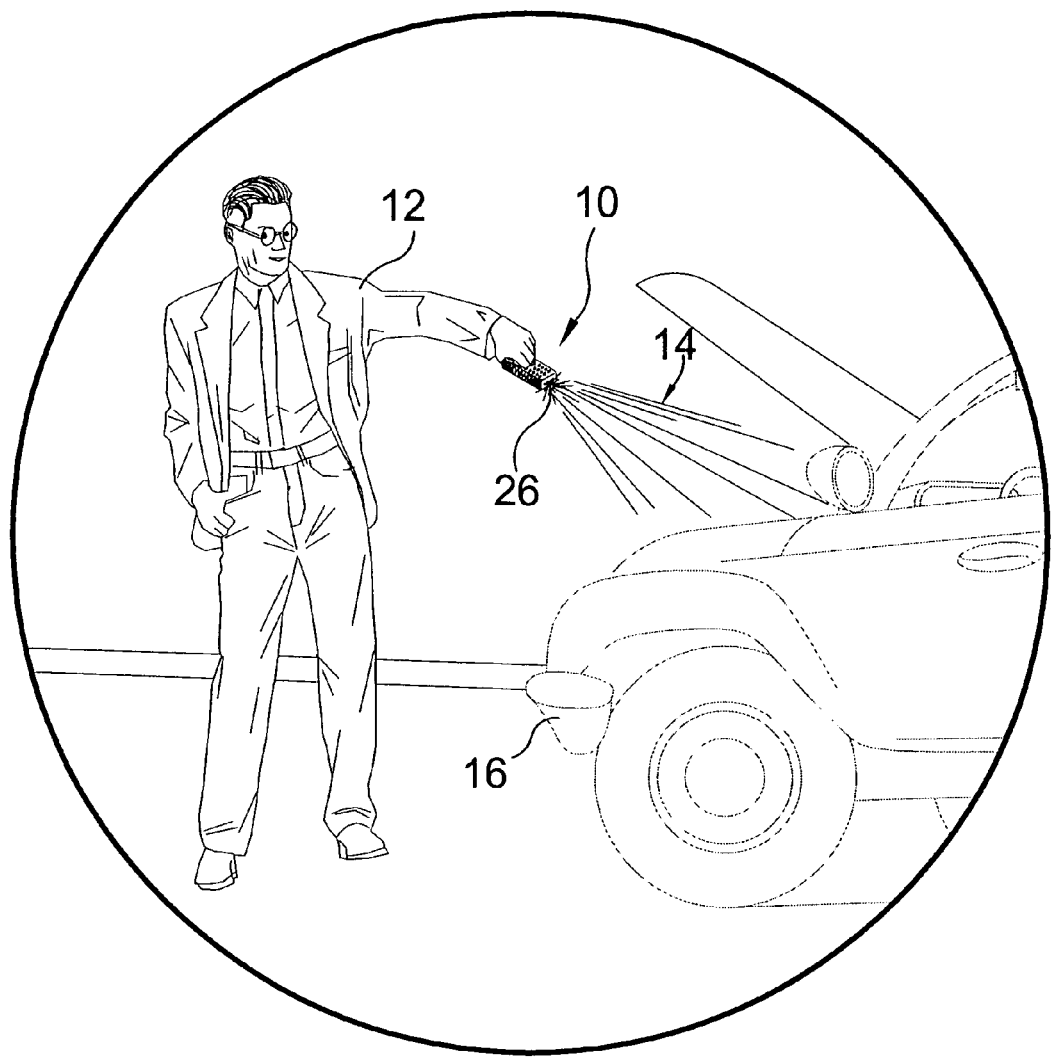
FIG. 1 is a perspective view of the cellular flashlight of the present invention illuminating a dark area.

Turning now descriptively to the drawings, in which similar reference characters denote similar elements throughout the several views, the Figures illustrate the cellular flashlight of the present invention. With regard to the reference numerals used, the following numbering is used throughout the various drawing Figures.

10 cellular flashlight of the present invention
12 user
14 light
16 vehicle
17 housing
18 cell phone
20 conventional cellular phone circuits
22 power source
24 switch
26 lamp
27 bulb
28 antenna
30 keypad
31 activation button
32 external light unit
36 connector
38 connection port
40 push-button light unit
46 twisting lamp unit
52 on/off directional switch
54 light unit
56 port
60 external power switch
61 light unit
62 beeper
63 first wire
64 front side display
65 second wire
66 rear side
67 batteries
68 power compartment
70 lamp power switch
72 laser light unit
74 cathode
76 laser light beam
78 external power source
80 110 VAC charger
82 12 volt DC charger

DETAILED DESCRIPTION OF THE PREFERRED EMBODIMENT

The following discussion describes in detail one embodiment of the invention and several variations of that embodiment. This discussion should not be construed, however, as limiting the invention to those particular embodiments, practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 14 illustrate the cellular flashlight of the present invention indicated generally by the numeral 10.

FIG. 1 is a perspective view of the cellular flashlight of the present invention illuminating a dark area. The cellular phone flashlight 10 (hereinafter "flashlight") of the present invention is shown here illuminating a dark area underneath the hood of a vehicle 16. A user 12 in possession of the cellular phone flashlight 10 points a lamp 26 of the flashlight 10 in the desired direction. Upon activating the lamp 26 of the flashlight 10, a bulb 27 connected to the lamp 26 emits light beams denoted by reference numeral 14. The light beams 14 illuminate a dark area in the immediate vicinity at which the bulb 27 of the lamp 26 is directed. The flashlight 10 of the present invention provides the user with a portable light that is connected to and derives power from a cellular phone. The flashlight 10 has many potential uses, only one of which is depicted in FIG. 1. Other potential uses for the flashlight 10 of the present invention include providing light to read a map while in a vehicle, providing light to assist a user in finding the keyhole of a lock in either a vehicle or a door, providing light to assist a user in searching a dark area such as a trunk, and providing a portable light source for any other desired purpose. The above mentioned uses of the flashlight 10 of the present invention are not to be taken in a limiting fashion and are provided for example only. A user 12 with the cellular phone flashlight 10 of the present invention can utilize the flashlight 10 for any desired purpose.

Figure 2:
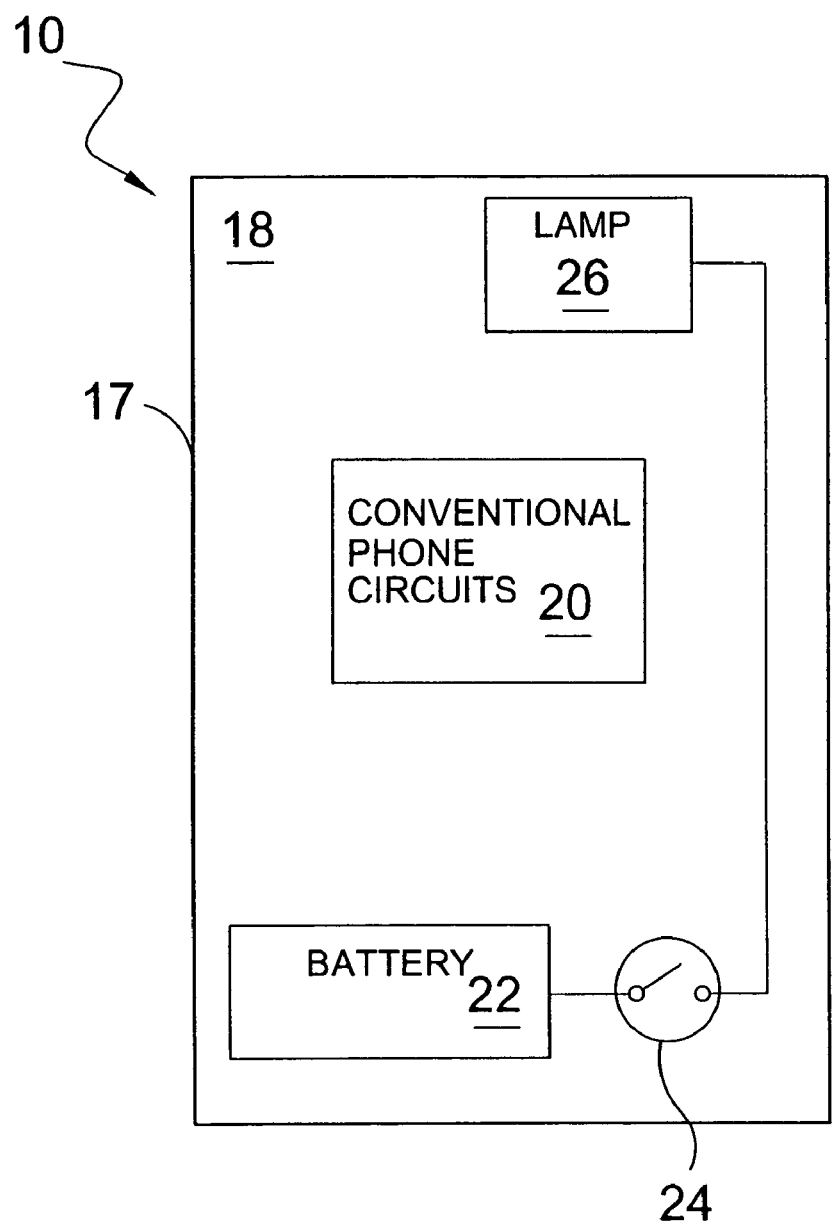
FIG. 2 is a block diagram of the cellular flashlight of the present invention showing a lamp as an integral part of the cellular phone.
Figure 4:
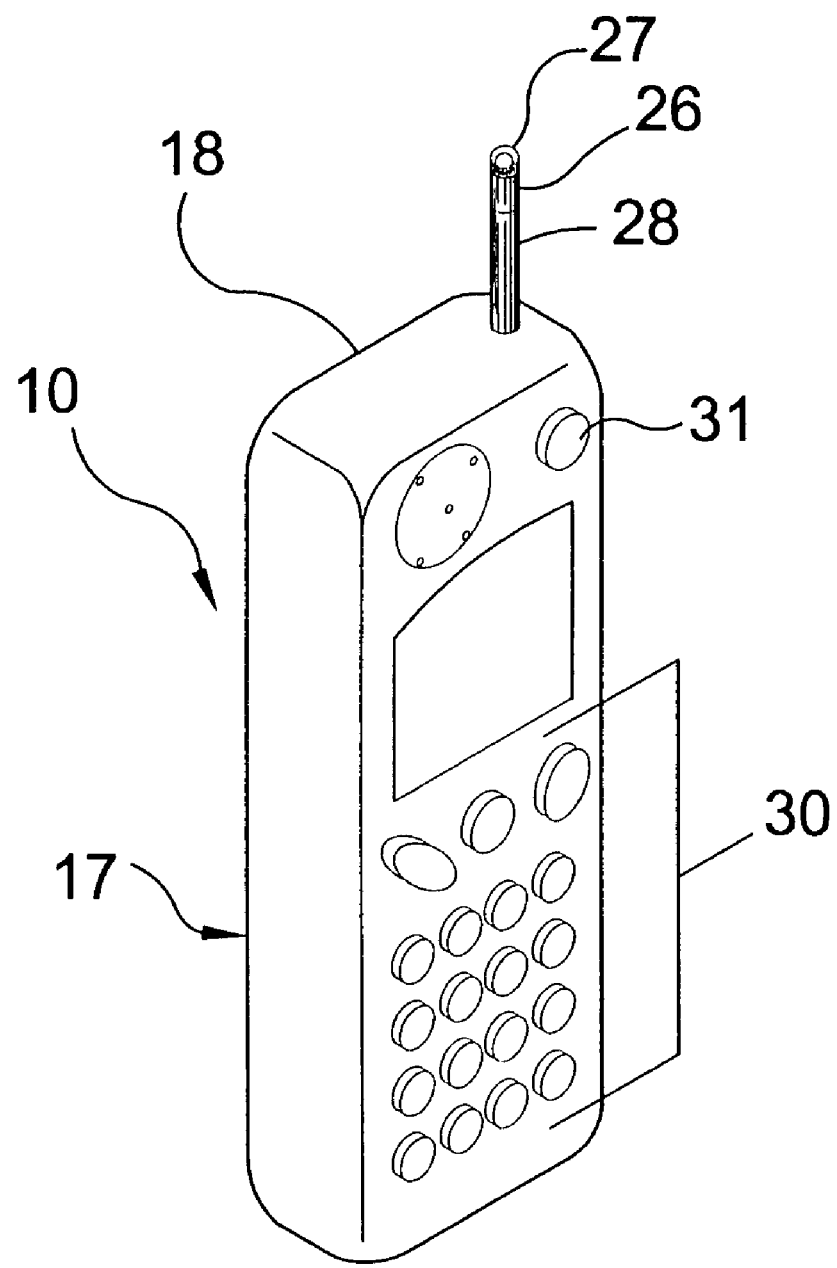
FIG. 4 is a perspective view of the cellular flashlight of the present invention whereby the lamp is positioned at the end of the antenna.

FIG. 2 is a block diagram of the cellular flashlight of the present invention showing a lamp 26 connected within the cellular phone 18. The cellular phone 18 has a housing 17. Contained within the housing 17 are conventional cellular phone circuits 20 and a power source 22. The flashlight 10 of the present invention includes a lamp 26. The lamp 26 includes a bulb 27 as can be seen in FIG. 4 for illuminating a dark area. The lamp 26 is connected to receive power from the power source 22 of the cellular phone 18. An on/off switch 24 is connected in series between the lamp 26 and the power source 22. When the on/off switch 24 is in the first open position, power from the power source 22 is not transferred to the lamp 26 and the bulb 27 is not illuminated. When the on/off switch 24 is in a second closed position, an electrical circuit is complete whereby the lamp 26 receives power from the power source 22 thereby causing the bulb 27 to be illuminated. The on/off switch 24 of the flashlight 10 of the present invention is positioned on the housing 17 of the cellular phone 18 and is user activated to turn the lamp 26 on and off. The on/off switch 24 is preferably a button on the housing 17. However, any switching mechanism that can move the on/off switch 24 from the first open position to the second closed position and vice versa can be used. Upon activating the on/off switch 24, a user can the point the bulb 27 of the lamp 26 in the direction desired to be illuminated. The bulb 27 emits light 14 therefrom and provides light to the desired area.

Figure 3:
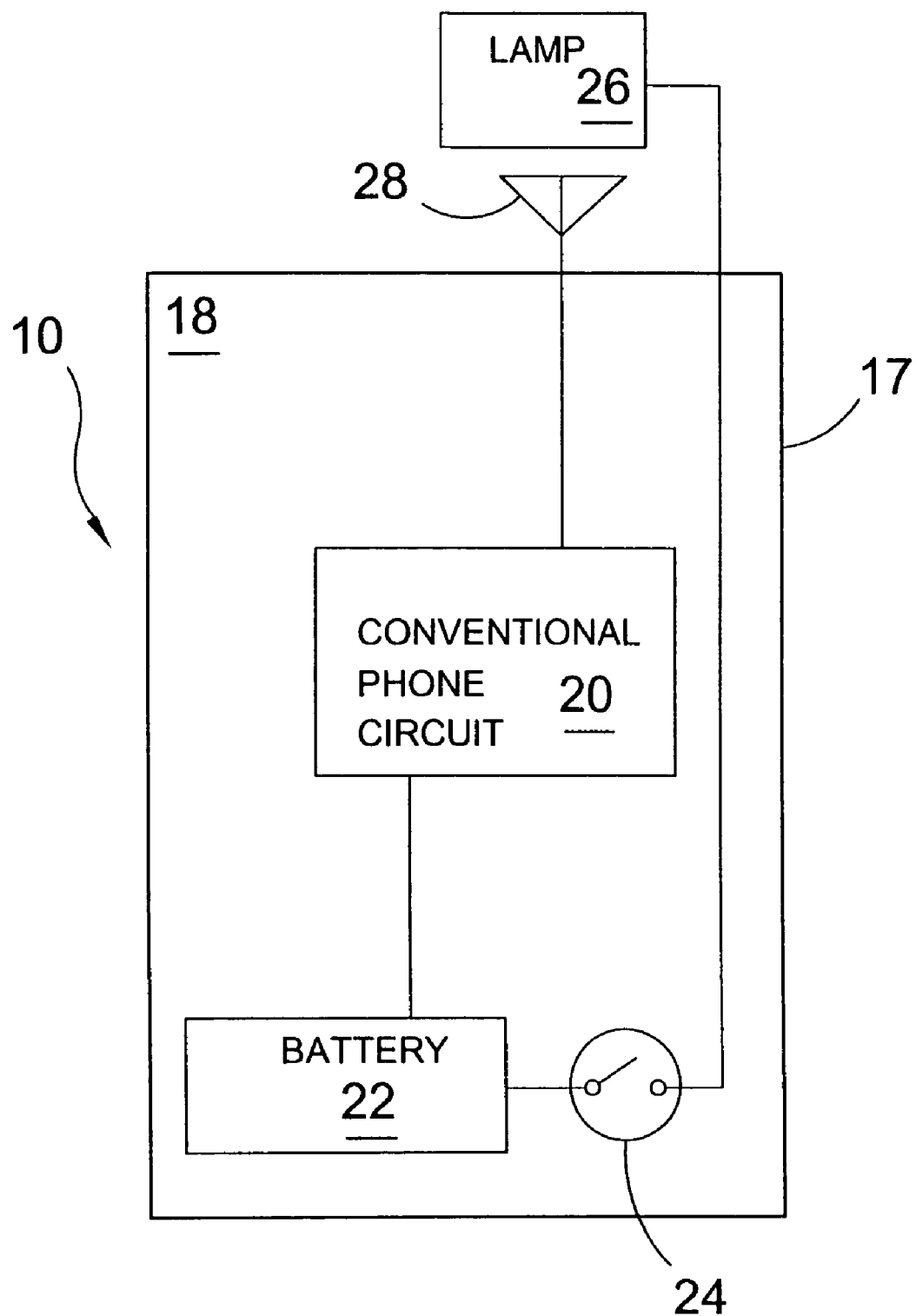
FIG. 3 is a block diagram of the cellular flashlight of the present invention wherein the lamp is external to the cellular phone.
Figure 5:
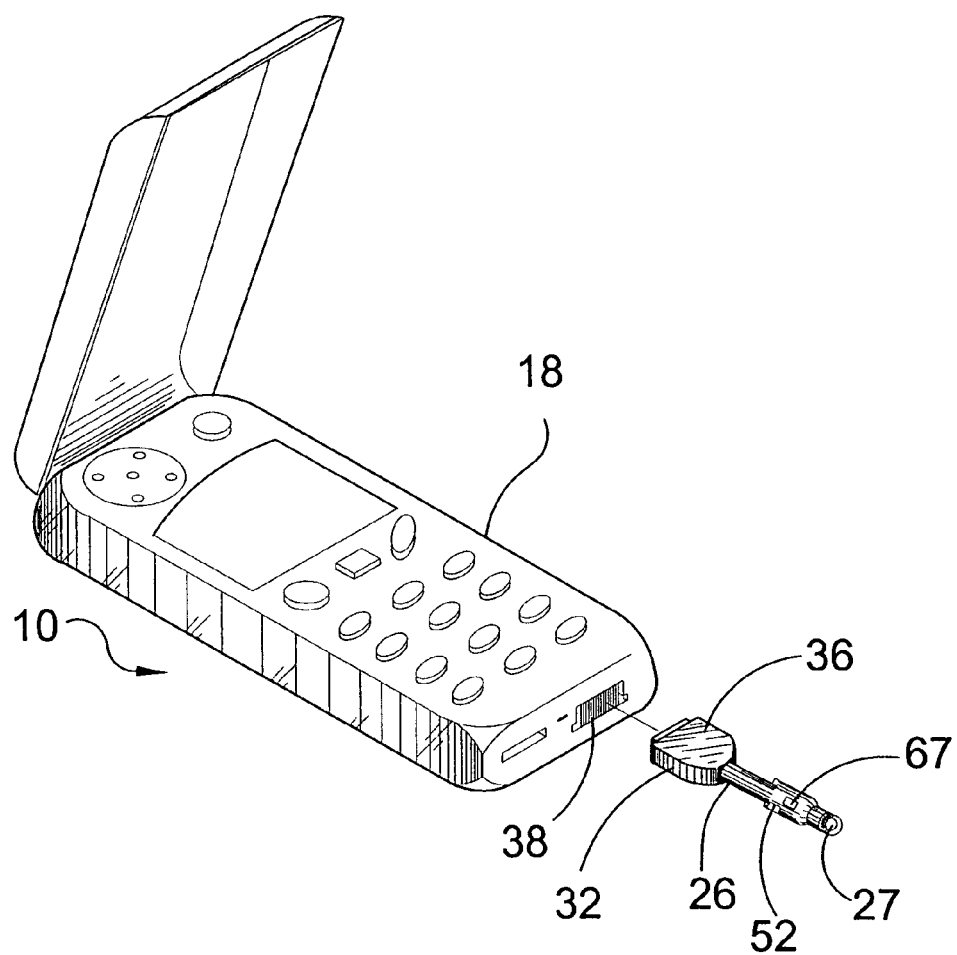
FIG. 5 is a perspective view of the cellular flashlight of the present invention whereby the light is to be plugged into a port on the housing of the cellular phone.

FIG. 3 is a block diagram of the cellular flashlight of the present invention wherein the lamp 26 is connected to the cellular phone 18. This embodiment of the flashlight 10 of the present invention includes the cell phone 18 having a housing 17. Contained within the housing 17 are conventional cellular phone circuits 20 and a power source 22. Extending from the housing 17 is an antenna 28. Positioned outside the housing 17, is the lamp 26 and the bulb 27 connected thereto as can be seen in FIGS. 4 and 5. The lamp 26 is connected to receive power from the power source 22 of the cellular phone 18. The on/off switch 24 is connected in series between the lamp 26 and the power source 22. When the on/off switch 24 is in the first open position, power from the power source 22 is not transferred to the lamp 26 and the bulb 27 is not illuminated. When the on/off switch 24 is in a second closed position, an electrical circuit is complete whereby the lamp 26 receives power from the power source 22 thereby causing the bulb 27 to be illuminated. The on/off switch 24 of the flashlight 10 of the present invention is positioned on the housing 17 of the cellular phone 18 and is user activated to turn the lamp 26 on and off. The on/off switch 24 is preferably a button on the housing 17. However, any switching mechanism that can move the on/off switch 24 from the first open position to the second closed position and vice versa can be used. Upon activating the on/off switch 24, a user can the point the bulb 27 of the lamp 26 in the direction desired to be illuminated. The bulb 27 emits light therefrom and provides light to the desired area.

FIG. 4 is a perspective view of the cellular flashlight of the present invention whereby the lamp 26 is positioned at the end of the antenna. FIG. 4 depicts the embodiment described above with respect to the block diagram of FIG. 3. This figure shows the cellular phone 18 having all the traditional known components thereof. Extending from the top side of the housing 17 is the antenna 28. The lamp 26 of the flashlight 10 of the present invention is positioned on a side of the antenna 28 opposite the housing 17. The lamp 26 includes the bulb 27 for emitting light for illuminating a dark area. As shown in FIG. 4, the lamp 26 of the flashlight 10 is off. When the user 12 desires to emit light from the flashlight 10, a switch, as can be seen in FIG. 3, is moved to the on position, thereby providing power to the bulb 27 causing the bulb 27 to illuminate. The on/off switch 24 is preferably activated by a button 31 positioned on the housing 17 of the cellular phone 18. A user could also activate the on/off switch 24 by entering a predetermined keystroke sequence on a keypad 30 of the cellular phone. The button 31 and the predetermined keystroke on a keypad 30 are used for purposes of example, and any method that can toggle the on/off switch 24 to move from a first open position to a second closed position may be used by the flashlight 10 of the present invention. Upon toggling the on/off switch 24 from the first open position to the second closed position, the lamp 26 is connected to receive power from the power source 22. Upon receiving power from the power source 22, the bulb 27 of the lamp 26 is caused to illuminate thereby emitting light therefrom.

FIG. 5 is a perspective view of the cellular flashlight of the present invention whereby the light unit is to be plugged into a port on the housing of the cellular phone. The flashlight 10 of the present invention includes an external light unit 32. The external light unit 32 includes the lamp 26 with the bulb 27 connected thereto. The external light unit 32 also includes a connector 36. The flashlight 10 is selectively connected to receive power from the power source 22 of the cellular phone 18. The cellular phone 18 has all of the traditional features known in the art, including a connection port 38. The connection port 38 is generally used to recharge the cellular phone power source via a charger (not shown). However, the connection port 38 is also adapted to receive the external light unit 32 of the flashlight 10 of the present invention. Upon receiving the connector 36 of the external light unit 32 in the connection port 38, the external light unit 32 is connected to the power source 22 of the cellular phone 18 or has self contained batteries 67 and thus power is provided to the lamp 26. Upon receiving power from the cellular phone 18, the lamp 26 causes the bulb 27 to be illuminated and thereby emit light. The way in which power is provided to the lamp 26 from the cellular phone 18 will be discussed hereinafter with specific reference to FIG. 7.

Figure 6:
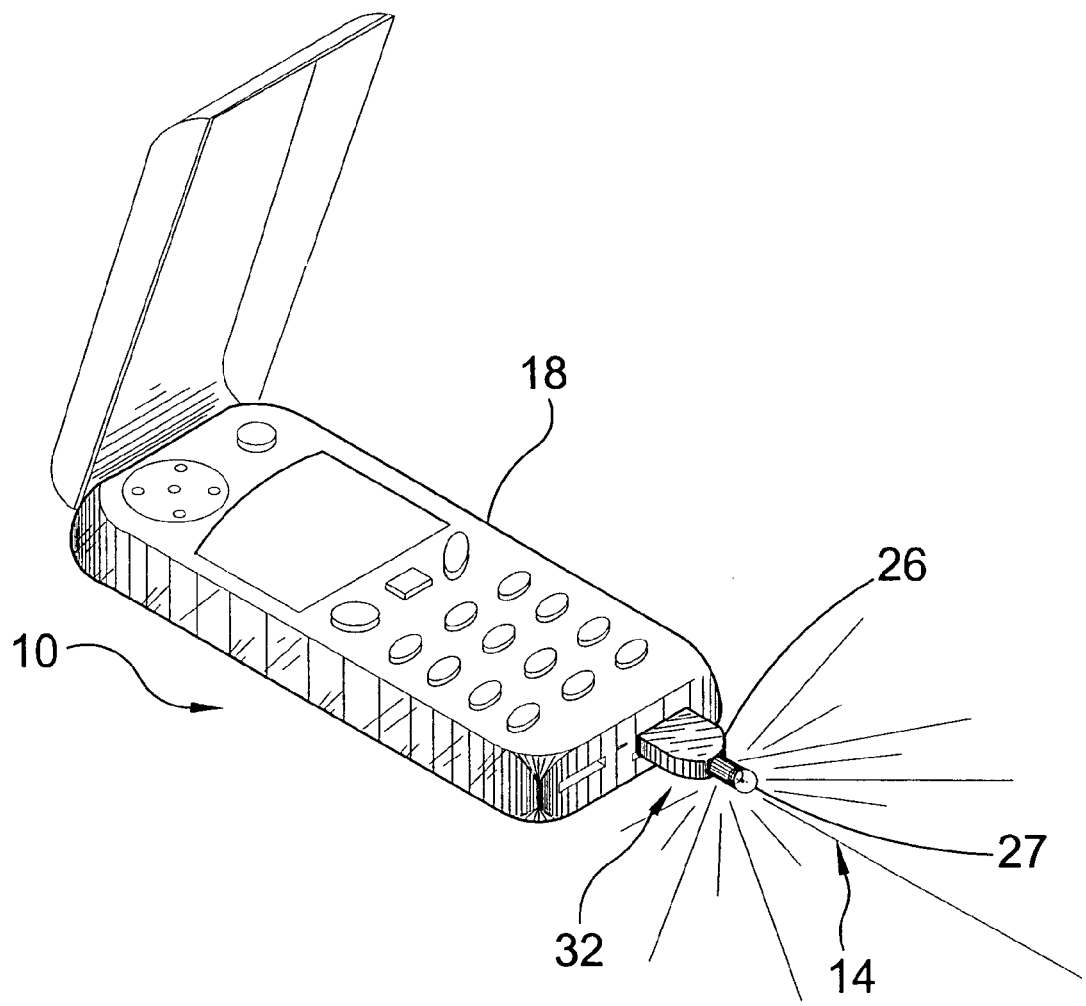
FIG. 6 is a perspective view of the cellular phone flashlight of the present invention with the light unit plugged into a port on the housing of the cellular phone and illuminated.

FIG. 6 is a perspective view of the cellular phone flashlight of the present invention with the light unit plugged into a port on the housing of the cellular phone. In this figure the light unit is shown providing illumination. The flashlight 10 of the present invention includes the external light unit 32. The external light unit 32 includes the lamp 26 with the bulb 27 connected thereto. The external light unit 32 also includes the connector 36. The flashlight 10 of the present invention receives power from the power source 22 of the cellular phone 18. The cellular phone 18 has all of the traditional features known in the art, including the connection port 38. The connection port 38 is generally used to recharge the cellular phone power source via a charger (not shown). However, in this embodiment, the connector 36 of the light unit 32 is connected to the connection port 38. Upon receiving the connector 36 of the external light unit 32 in the connection port 38, the light unit 32 is connected to receive power from the power source of the cellular phone 18. Upon receiving power, the lamp 26 causes the bulb 27 to be illuminated thereby emitting light therefrom. The way in which power is provided to the lamp 26 from the cellular phone 18 will be discussed with specific reference to FIG. 7. Upon illumination, a user can point the cellular phone in any direction thereby providing light to any desired dark area.

Figure 7:
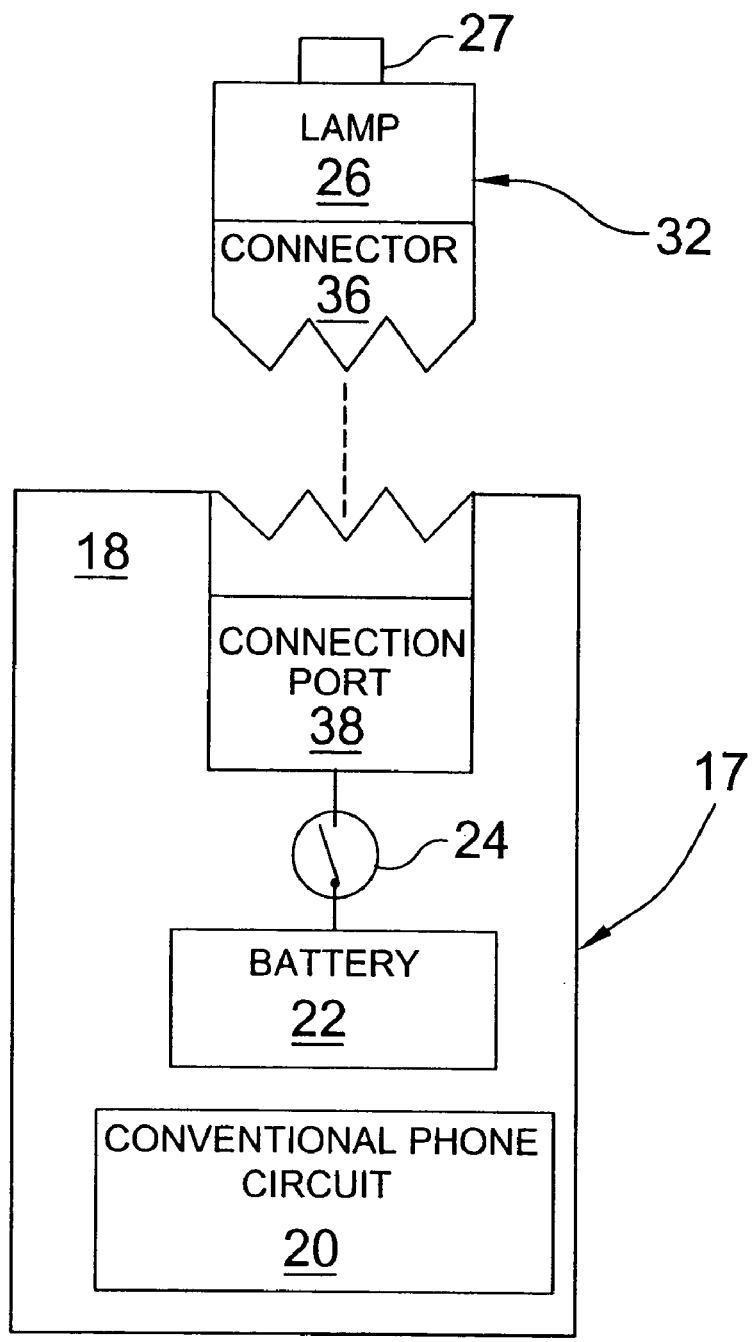
FIG. 7 is a block diagram of the cellular flashlight of the present invention wherein the lamp is connected to a port of the cellular phone.

FIG. 7 is a block diagram of the cellular flashlight of the present invention wherein the lamp is connected to a port of the cellular phone as shown in FIGS. 5 and 6. The flashlight 10 of the present invention is connected to the cellular phone 18. The cellular phone 18 includes the housing 17. Contained within the housing 17 are the conventional cellular phone circuits 20 and the power source 22 connected thereto. The housing 17 of the cellular phone 18 has the connection port 38 positioned thereon. The connection port 38 is selectively connected to the power source 22 of the cellular phone 18. The on/off switch 24 is connected in series between the connection port 38 and the power source 22. The connection port 38 is generally used for re-charging the cellular phone 18. However, the connection port 38 is also adapted to receive the external light unit 32 of the flashlight 10 of the present invention. The external light unit 32 includes the lamp 26 having the bulb 27 connected thereto for providing light therefrom. The external light 32 also includes the connector 36. The connection port 38 is able to receive the connector 36 of the external light unit 32. Upon receipt of the connector 36 by the connection port 38, the on/off switch 24 is caused to move from a first open position to a second closed position thereby completing an electrical circuit. Upon completion of this electrical circuit, the external light unit 32 receives power from the power source 22. Power is transferred from the power source 22, through the connection port 38 and further through the connector 36 and is received by the lamp 26. Upon receiving power, the lamp 26 causes the bulb 27 to be illuminated. When the need for a portable light source is no longer necessary, a user removes the external light unit 32 from the connection port 38. Upon removal of the external light unit 32, the on/off switch 24 is caused to move from its second closed position to the first open position thereby disrupting the electrical circuit and preventing power from being transferred from the power source 22 to the connection port 38.

Figure 8:
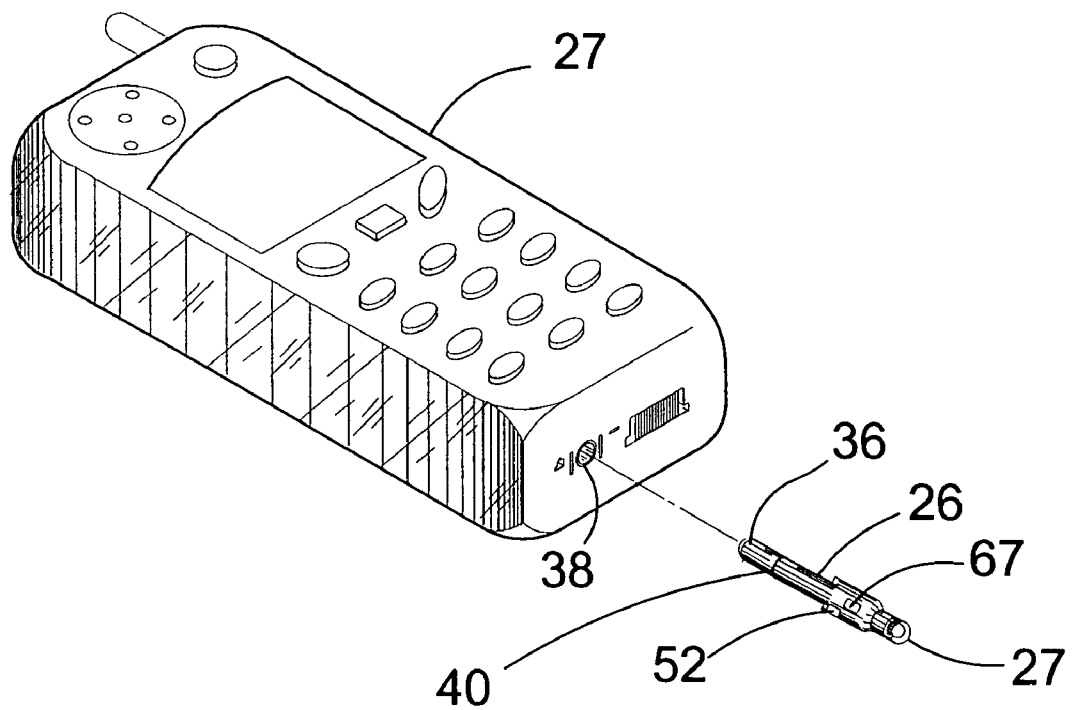
FIG. 8 is a perspective view of the cellular flashlight of the present invention having an external bulb switch inserted into a connection port on the bottom side of the cellular phone.

FIG. 8 is a perspective view of the cellular flashlight of the present invention having a push button light unit inserted into a connection port on the bottom side of the cellular phone. This embodiment of the flashlight 10 of the present invention includes a push-button light unit 40 having a connector 36. The lamp 26 is positioned on a side of the push button light unit 40 opposite the connector 36. The lamp 26 further includes the bulb 27 connected thereto for providing light. The cellular phone 18 includes a housing 17 having a connection port 38 positioned on a side thereof. The connector 36 of the push-button light unit 40 is connected to the cellular phone via the connection port 38. Upon receiving the connector 36 in the connection port 38, the push button light unit 40 is able to be illuminated thereby producing light from the bulb 27 of the lamp 26. The push button light unit 40 is activated by a user depressing the bulb 27 of the lamp 26. Depressing the bulb causes an internal on/off switch 24, as shown in FIG. 2, to be moved from a first opened position to a second closed position thereby completing an electrical circuit. Upon completion of this electrical circuit, power is provided from the power source 22 of the cellular phone 18 or from self contained batteries 67 to the lamp 26 thereby causing the bulb 27 to be illuminated. The flashlight 10 can be deactivated by depressing the bulb 27 a second time. Depressing the bulb 27 a second time causes the on/off switch, as shown in FIG. 2, to be moved from the second closed position to the first open position thereby disrupting the electrical circuit and preventing power from being transferred to from the power source 22 to the push button light unit 40.

Figure 9:
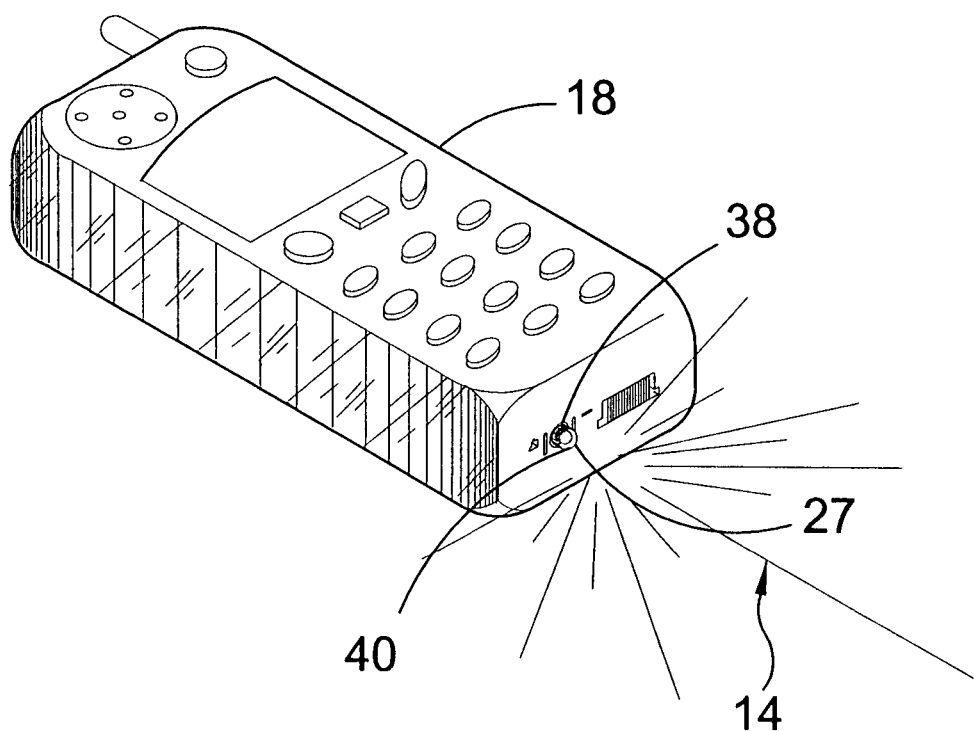
FIG. 9 is a perspective view of the cellular phone flashlight of the present invention having an external bulb switch inserted into a connection port on the bottom side of a cellular phone with the bulb being illuminated.

FIG. 9 is a perspective view of the cellular phone flashlight of the present invention having a push button light unit inserted into a connection port on a side of a cellular phone. In this figure, the bulb 27 is shown in an illuminated state. The flashlight 10 shown includes the push-button light unit 40 having a connector 36. A lamp 26 positioned is on a side of the push button light unit 40 opposite the connector 36. The lamp 26 further includes a bulb connected thereto for providing light. The cellular phone 18 includes the housing 17 having the connection port 38 positioned on a side thereof. The connector 36 of the push-button light unit 40 is connected to the cellular phone via the connection port 38. Upon receiving the connector 36 by the connection port 38, the push button light unit 40 is able to be illuminated thereby producing light from the bulb 27 of the lamp 26. The push button light unit 40 is activated by the user depressing the bulb 27 of the lamp 26. Depressing the bulb causes the internal on/off switch 24, as shown in FIG. 2, to be moved from the first opened position to the second closed position thereby completing an electrical circuit. Upon completion of this electrical circuit, power is provided from the power source 22 of the cellular phone 18 to the lamp 26 thereby causing the bulb 27 to be illuminated. The flashlight 10 can be deactivated by depressing the bulb 27 a second time. Depressing the bulb 27 a second time causes the on/off switch, as shown in FIG. 2, to be moved from the second closed position to the first open position thereby disrupting the electrical circuit and preventing power from being transferred to from the power source 22 to the push button light unit 40.

Figure 10:
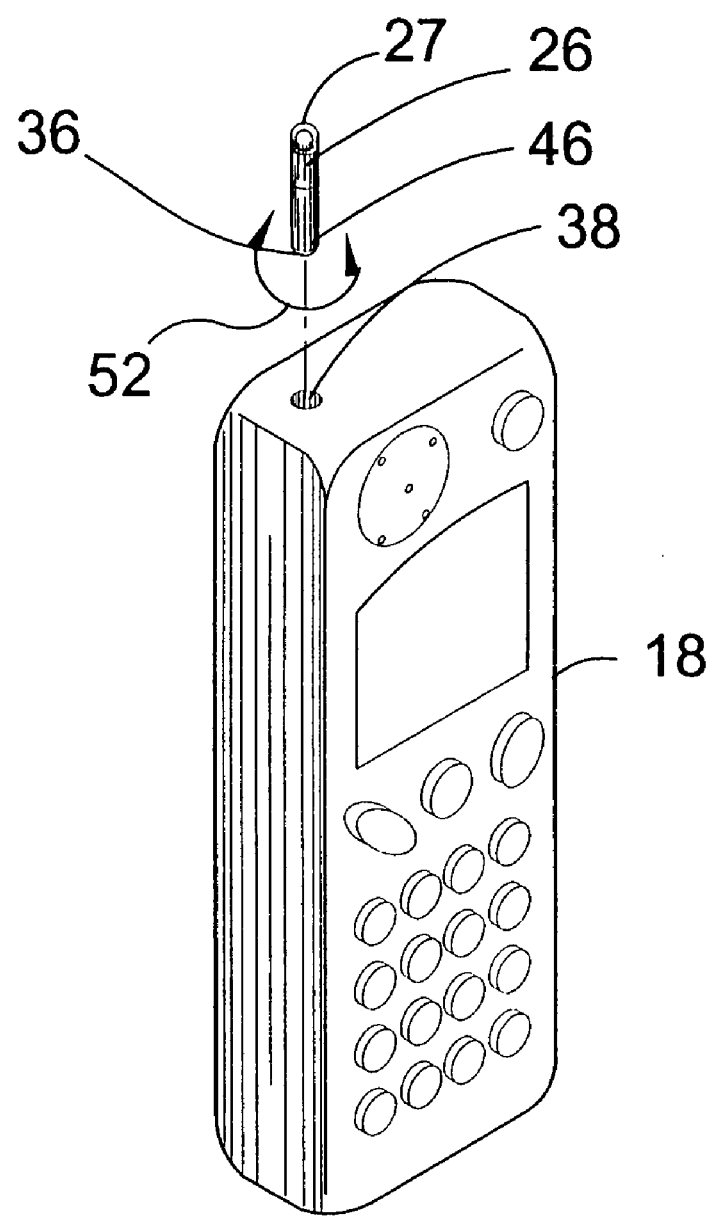
FIG. 10 is an illustrative view of the cellular phone flashlight of the present invention having an external bulb switch inserted into a connection port on the top side of the cellular phone.

FIG. 10 is an illustrative view of the cellular phone flashlight of the present invention having a twisting light unit inserted into a connection port on the top side of the cellular phone. This embodiment of the flashlight 10 of the present invention includes a twisting light unit 46 with the connector 36. A lamp 26 positioned on a side of the twisting light unit 46 opposite the connector 36. The lamp 26 further includes a bulb 27 connected thereto for providing light. The cellular phone 18 includes a housing 17 having a connection port 38. The connector 36 of the twisting light unit 46 is connected to the connection port 38. Upon receiving the connector 36 by the connection port 38, the twisting light unit 46 is able to be illuminated and caused to produce light from the bulb 27 of the lamp 26. The twisting light unit 46 is activated by a user rotating the bulb 27 of the lamp 26 in the direction indicated by the arrow labeled 52. Rotating the bulb 27 causes an internal on/off switch 24, as shown in FIG. 2, to be moved from a first open position to a second closed position. An electrical circuit is thereby completed causing power to be provided to the lamp 26 and causing the bulb 27 to be illuminated. A user can then rotate the bulb 27 in the opposite direction in order to deactivate the flashlight 10. Rotating the bulb 27 a second time causes the on/off switch, as shown in FIG. 2, to be moved from the second closed position to the first open position thereby disrupting the electrical circuit and preventing power from being transferred to the twisting light unit 46.

Figure 11:
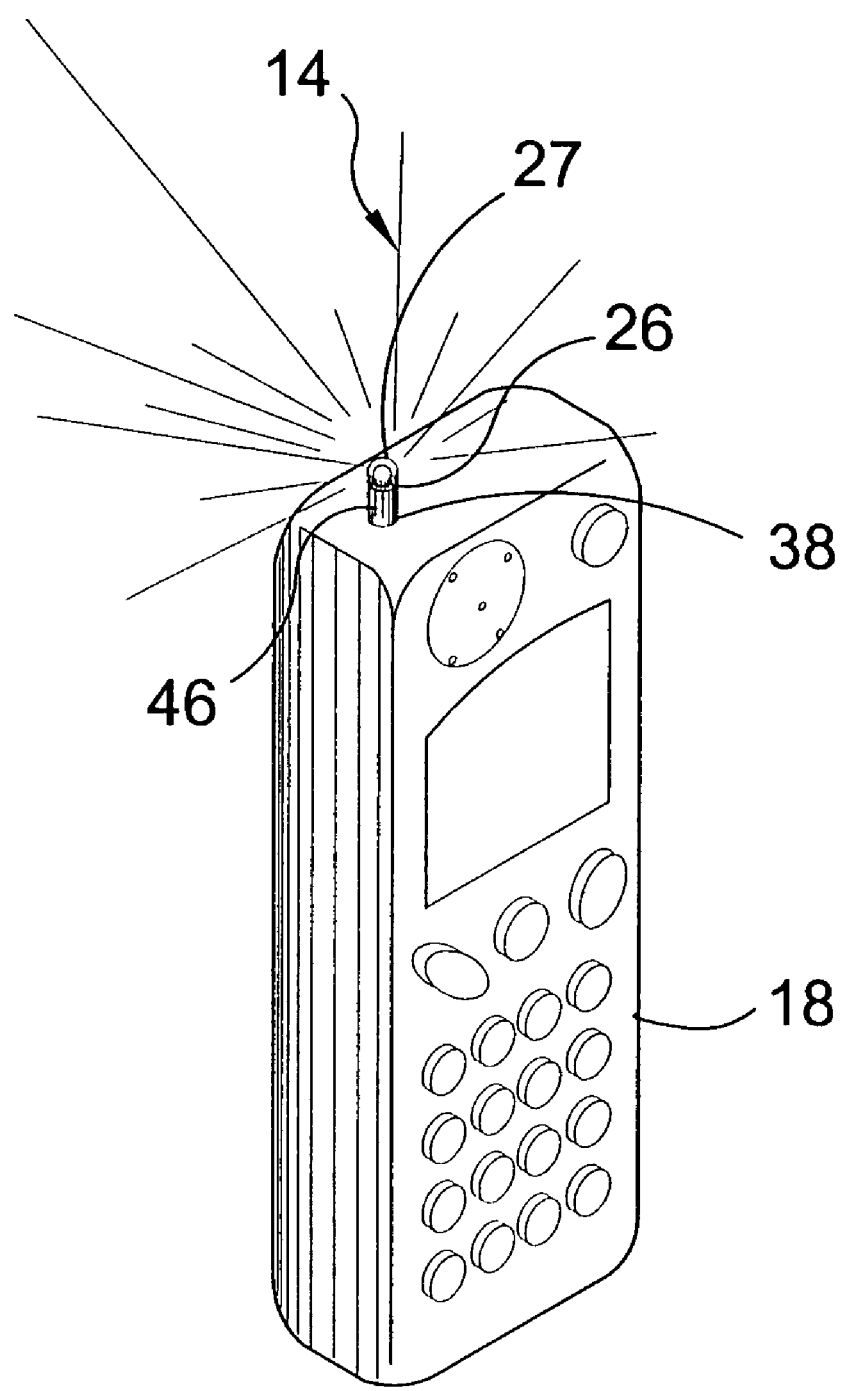
FIG. 11 is a perspective view of the cellular phone flashlight of the present invention having an external bulb switch inserted into a connection port on the top side of a cellular phone with the bulb being illuminated.

FIG. 11 is a perspective view of the cellular phone flashlight of the present invention having a twisting light unit inserted into a connection port on the top side of a cellular phone. This figure shows the bulb 27 of the twisting light unit 46 in an illuminated state. This embodiment of the flashlight 10 of the present invention includes the twisting light unit 46 having the connector 36 and the lamp 26 positioned on a side of the twisting light unit 46 opposite the connector 36. The lamp 26 further includes the bulb 27 connected thereto for providing light. The cellular phone 18 includes a housing 17 having a connection port 38. The connector 36 of the twisting light unit 46 is connected to the connection port 38. Upon receiving the connector 36, the twisting light unit 46 is able to be activated and caused to illuminate. The twisting light unit 46 is activated by a user rotating the bulb 27 of the lamp 26 in the direction indicated by the arrow labeled 52. Rotating the bulb 27 causes the internal on/off switch 24, as shown in FIG. 2, to be moved from the first open position to the second closed position. An electrical circuit is thereby completed causing power to be provided to the lamp 26 and causing the bulb 27 to be illuminated. A user can then rotate the bulb 27 in the opposite direction in order to deactivate the flashlight 10. Rotating the bulb 27 a second time causes the on/off switch, as shown in FIG. 2, to be moved from the second closed position to the first open position thereby disrupting the electrical circuit and preventing power from being transferred to the twisting light unit 46.

Figure 12:
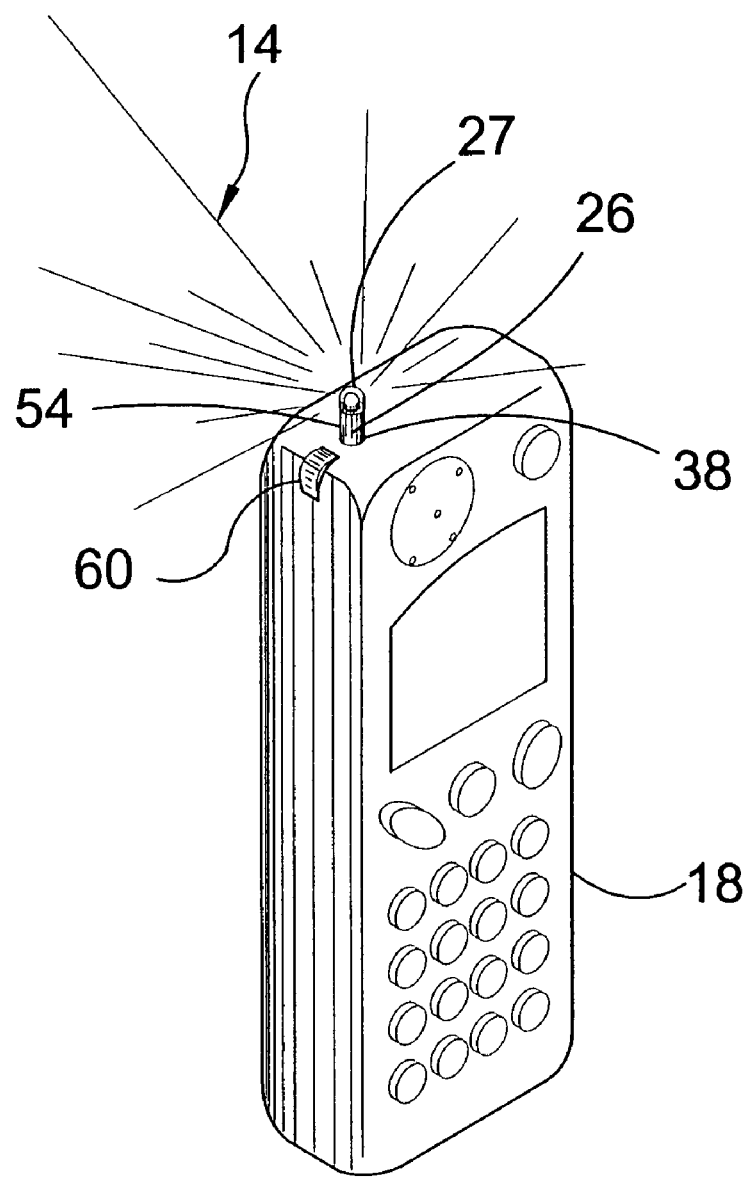
FIG. 12 is an illustrative view of the cellular phone flashlight of the present invention extending from the external housing of the phone and having an on/off switch positioned on the housing of the phone.

FIG. 12 is a perspective view of the cellular flashlight of the present invention having an on/off switch positioned on the housing of the phone. This embodiment of the flashlight 10 of the present invention includes a light unit 54. FIG. 12 shows the light unit 54 being illuminated. The light unit 54 extends from the housing 17 of the cellular phone 18 on a side thereof. The light unit 54 includes the lamp 26 and the bulb 27 for emitting light therefrom. An external on/off switch 60 is also positioned on the housing 17 of the cellular phone at a predetermined distance from the light unit 54. When a user desires to illuminate a dark area, the user depresses the external on/off switch 60 thereby causing an electrical circuit to be completed. Upon completion of this electrical circuit, power is provided to the lamp 26 of the light unit 54 thereby causing the bulb 27 to be illuminated. When the user no longer desires to illuminate the dark area, the user depresses the external on/off switch 60 a second time. Depressing the external on/off switch a second time causes the completed electrical circuit to be opened thereby preventing power from being provided to the lamp 26 of the light unit 54.

Figure 13:
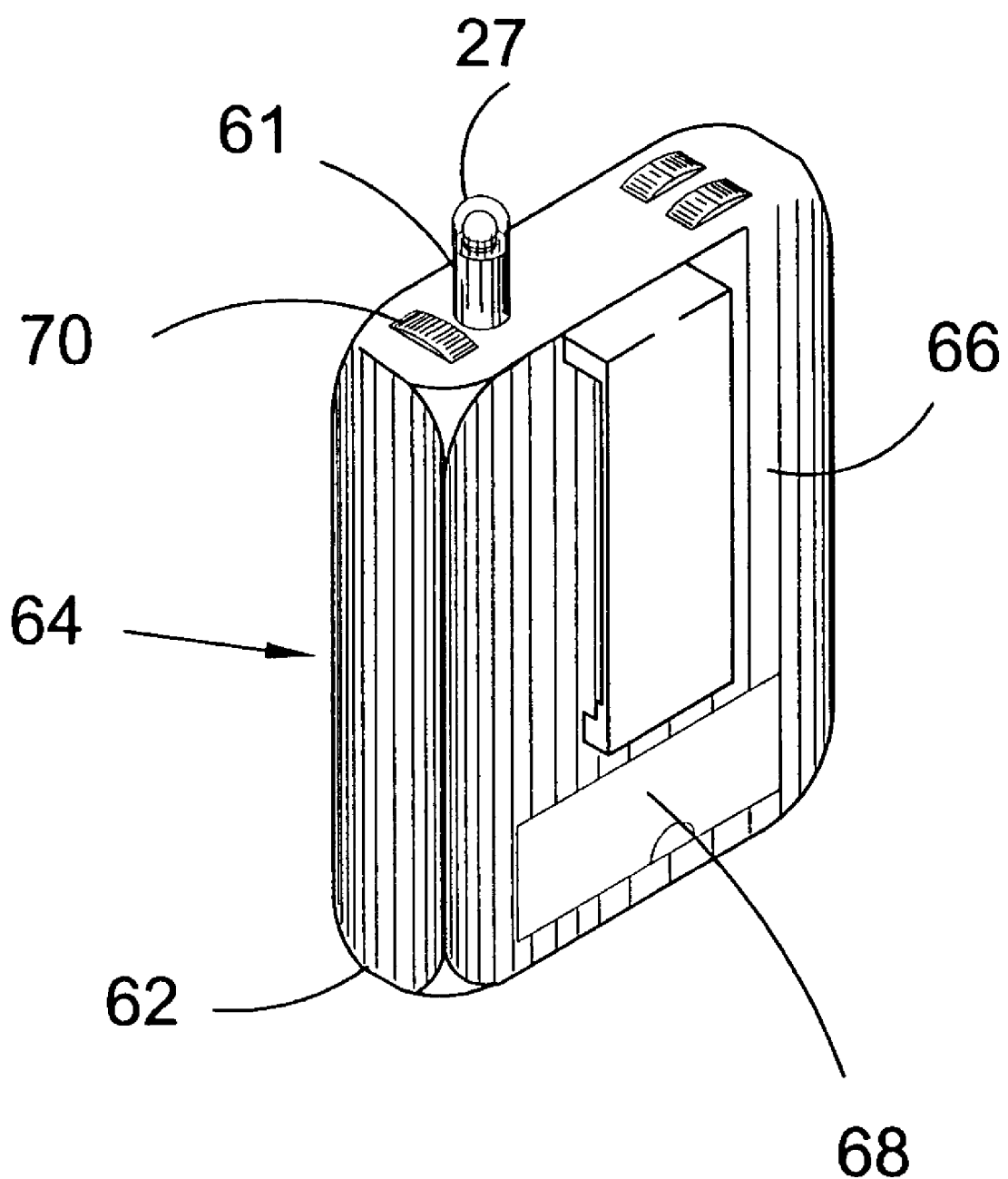
FIG. 13 is a perspective rear side view of a beeper having a cellular flashlight positioned on the external housing thereof.

FIG. 13 is a perspective rear side view of the cellular flashlight of the present invention in combination with a beeper. The beeper 62 has a beeper housing 66. Shown in FIG. 13 is the rear side of the beeper housing 66. The rear side of the beeper housing 66 includes a battery compartment 68 for receiving a dry-cell battery to power the beeper 62. Extending outward from a side of the beeper housing 66 is the light unit 61. The light unit 61 includes a lamp 26 and a bulb 27 connected to the lamp 26. Further positioned on the beeper housing 66 is an on/off switch 70. The on/off switch 70 is positioned at a predetermined distance from the beeper light unit 61. When a user with the beeper 62 containing the light unit 61 needs a source of light, the user depresses the on/off switch 70 which causes an electrical circuit to be completed. Upon completion of this electrical circuit, power is provided to the lamp 26 of the light unit 61 thereby causing the bulb 27 connected to the lamp 26 to be illuminated. When a user no longer desires a light source, the user depresses the on/off switch 70 a second time thereby disrupting the completed electrical circuit. Power is the no longer transferred to the light unit 61 and the bulb 27 connected to the lamp 26 is no longer illuminated.

Figure 14:
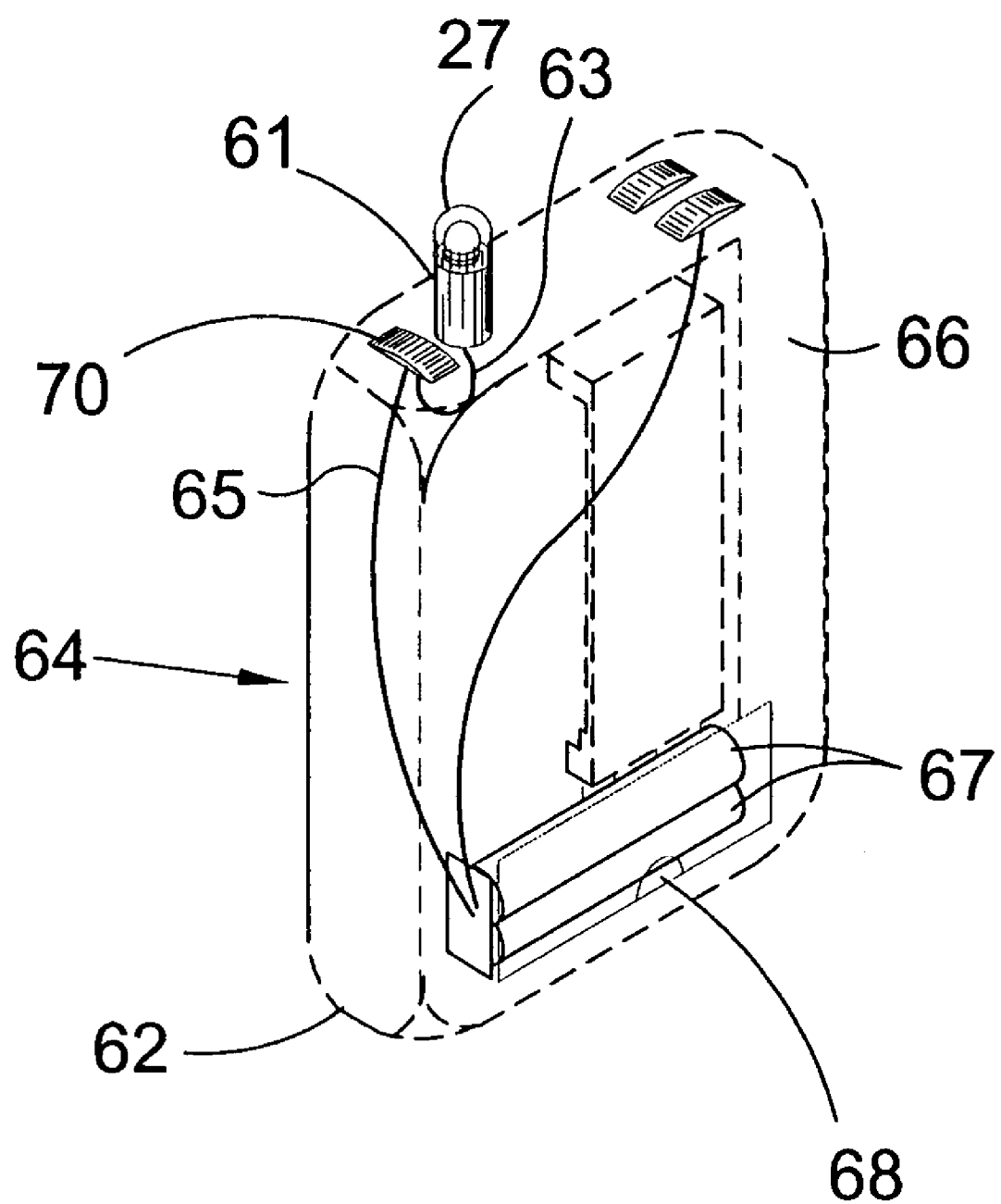
FIG. 14 is a cut away view of the beeper shown in FIG. 13 having a cellular flashlight showing the internal wiring thereof.

FIG. 14 is a cut away view of the beeper shown in FIG. 13 having a light unit 61 showing the internal wiring thereof. The beeper 62 includes the beeper housing 66. The rear side of the beeper housing includes the battery compartment 68 for receiving a dry-cell battery 67 to power the beeper 62. Extending outward from the side of the beeper housing 66 is the light unit 61. The light unit 61 includes the lamp 26. The bulb 27 connected to the lamp 26. Further positioned on the beeper housing 66 is the on/off switch 70. The on/off switch 70 is positioned at a predetermined distance from the light unit 61. The on/off switch 70 is connected to the light unit 61 by a first wire 63. The on/off switch 70 is connected to the dry-cell battery 67 in the battery compartment 68 by a second wire 65.

When a user with the beeper 62 containing the light unit 61 needs a source of light, the user depresses the on/off switch 70. This causes an electrical circuit to be completed by connecting the first wire 63 with the second wire 65. Upon completion of this electrical circuit, power from the battery 67 is provided to the lamp 26 of the light unit 61 via the first and second wires 63 and 65, respectively, thereby causing the bulb 27 connected to the lamp 26 to be illuminated. When a user no longer desires a light source, the user depresses the on/off switch 70 a second time thereby disconnecting the first wire 63 from the second wire 65. Power is then no longer transferred from the battery 67 to the beeper light unit 61 and the bulb 27 connected to the lamp 26 is no longer illuminated.

Figure 15:
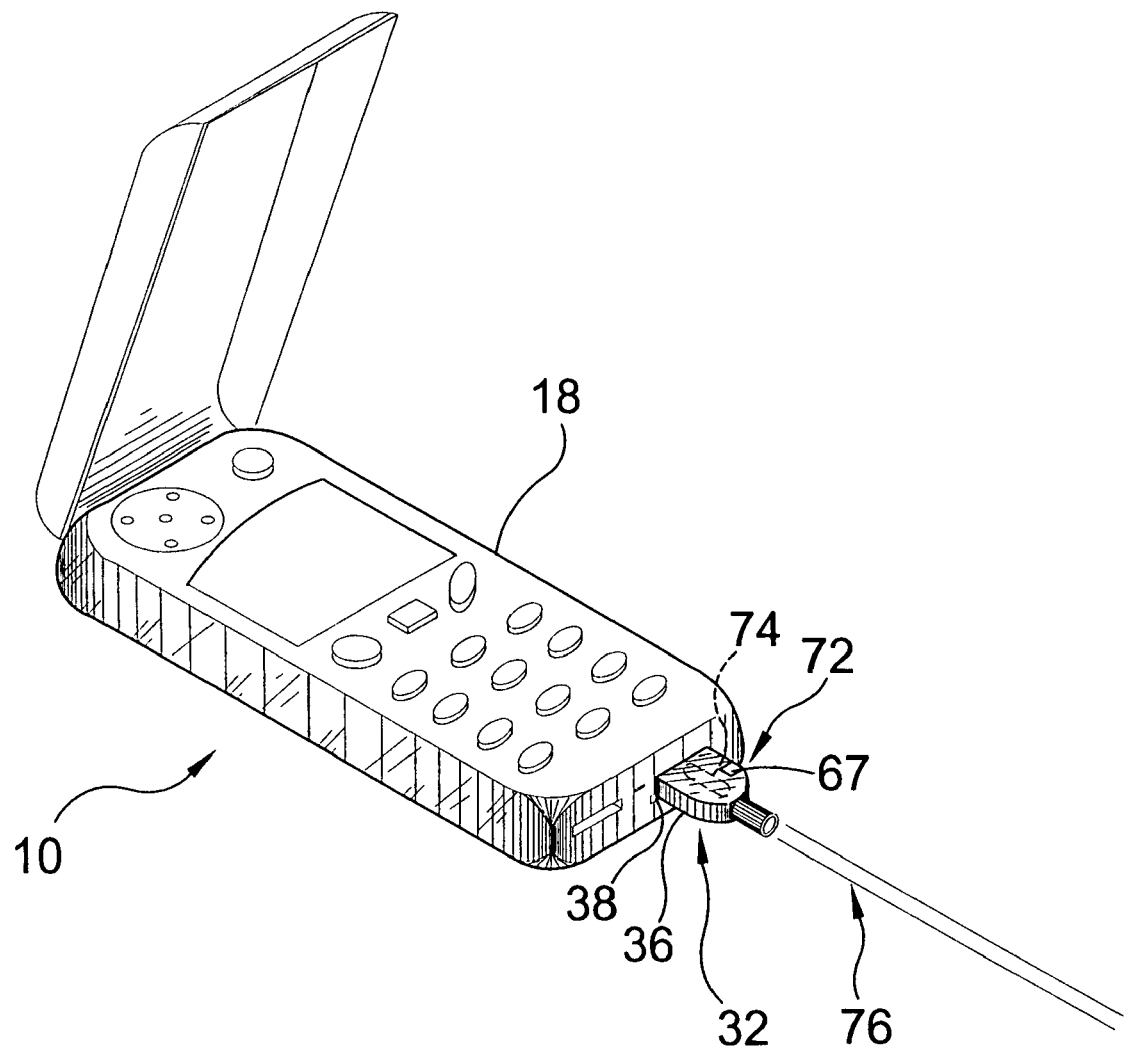
FIG. 15 is a perspective view of an additional element of the present invention whereby a laser unit is plugged into a port on the housing of the cellular phone.

FIG. 15 is a perspective view of an additional element of the present invention whereby a laser unit is plugged into a port on the housing of the cellular phone. The laser light unit 72 of the present invention includes an external light unit 32. The external light unit 32 includes the laser unit 72 thereto. The external light unit 32 also includes a connector 36. The laser light unit 72 is selectively connected to receive power from the power source 22 of the cellular phone 18 or alternately from a self contained power source 67. The cellular phone 18 has all of the traditional features known in the art, including a connection port 38. The connection port 38 is generally used to recharge the cellular phone power source via a charger (not shown). However, the connection port 38 is also adapted to receive the external light unit 32 of the flashlight 10 of the present invention. Upon receiving the connector 36 of the external light unit 32 in the connection port 38, the external light unit 32 is connected to the power source 22 of the cellular phone 18 and thus power is provided to the laser light unit. Upon receiving power from the cellular phone 18, the cathode 74 causes the laser light unit 72 to be illuminated and thereby emit a laser light beam 76.

Figure 16:
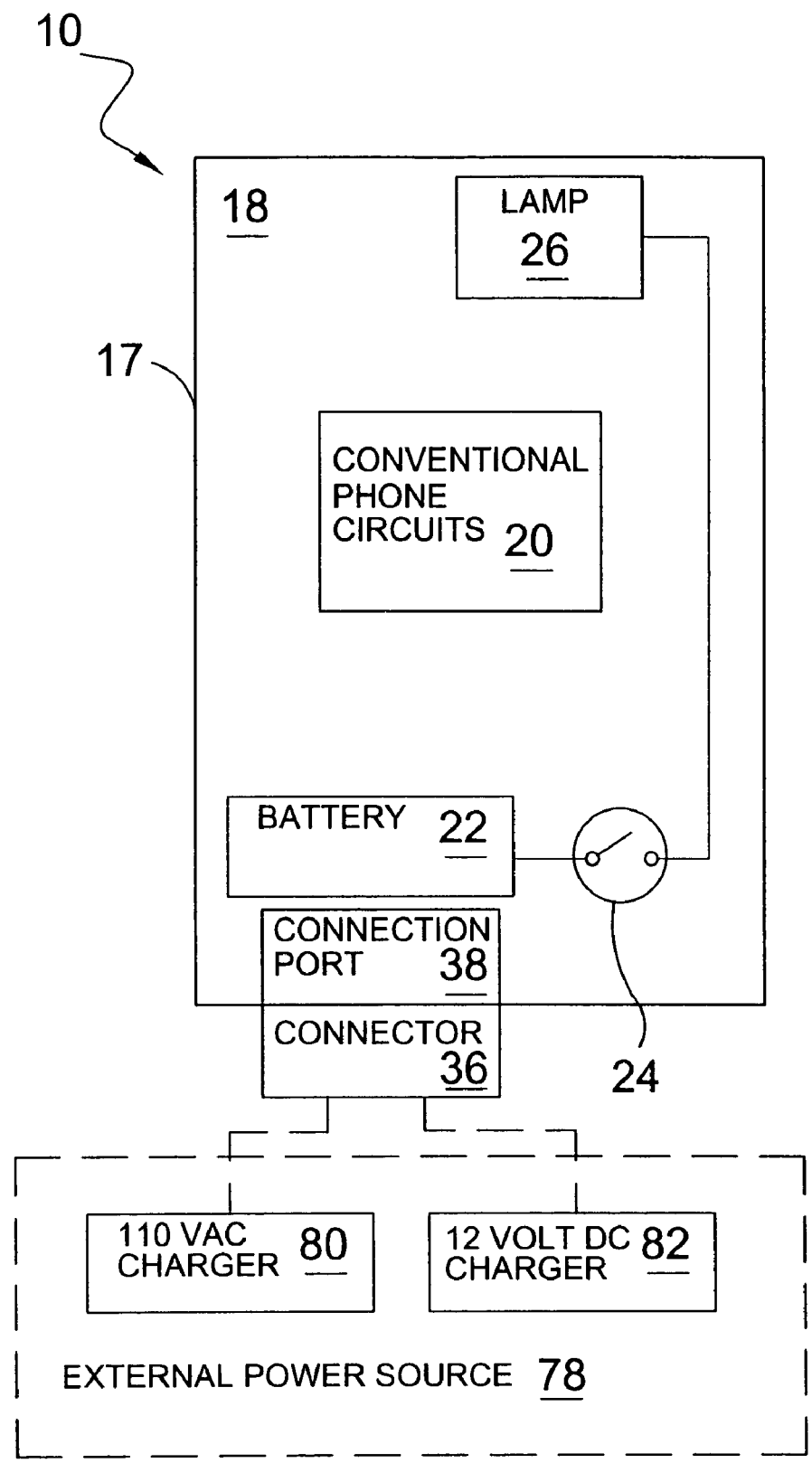
FIG. 16 is a block diagram of the present invention wherein an external power source is provided.

FIG. 16 is a block diagram of the present invention wherein an external power source is provided. The lamp 26 and the conventional phone circuits 20 derive power from the battery 22 which may be charged when the connector 36 of a 110 VAC charger 80 or a 12 volt DC charger 82 is plugged into the connection port 38 of the cellular flashlight 10 and the charger 80,82 is in communication with an appropriate external power source 78. Furthermore, the cellular flashlight 10 may operate from said external power source 78 in the event of a low or fully discharged battery.

Figure 17:
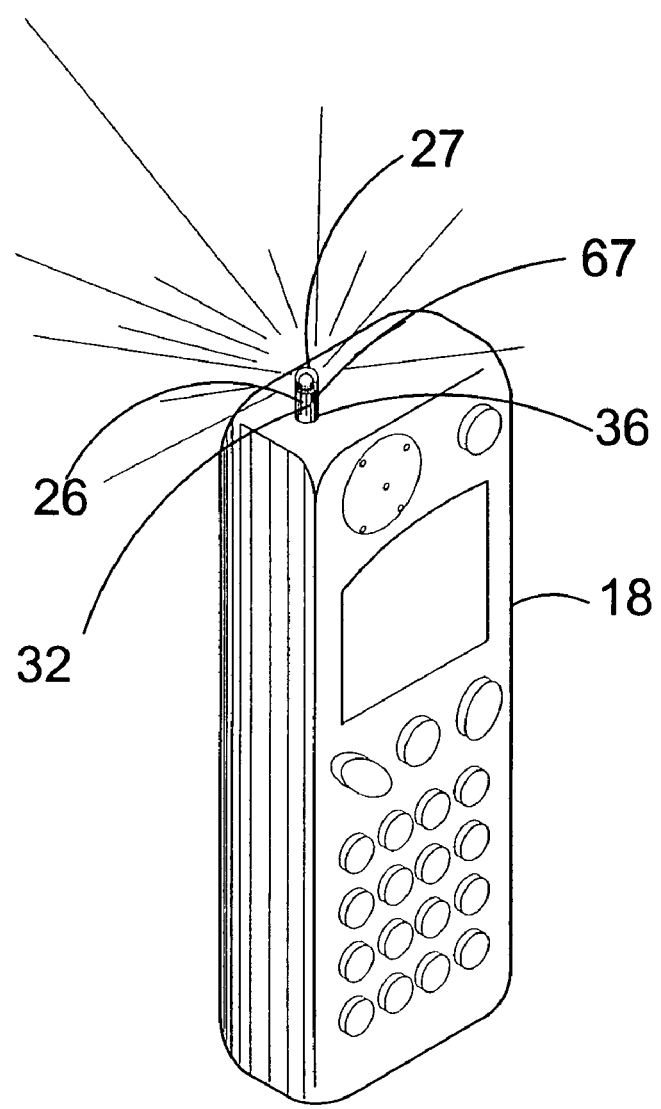
FIG. 17 is a perspective view of the present invention wherein the flashlight module is positioned within the cell phone.

FIG. 17 is a perspective view of the present invention wherein the flashlight module 32 is positioned within the cell phone 18. The flashlight module 32 has a self contained power source 67 within said flashlight module 36 whereby said flashlight module 32 is illuminable by rotation of said module. To extinguish the flashlight 32 the unit is rotated in the opposite direction.

Figure 18:
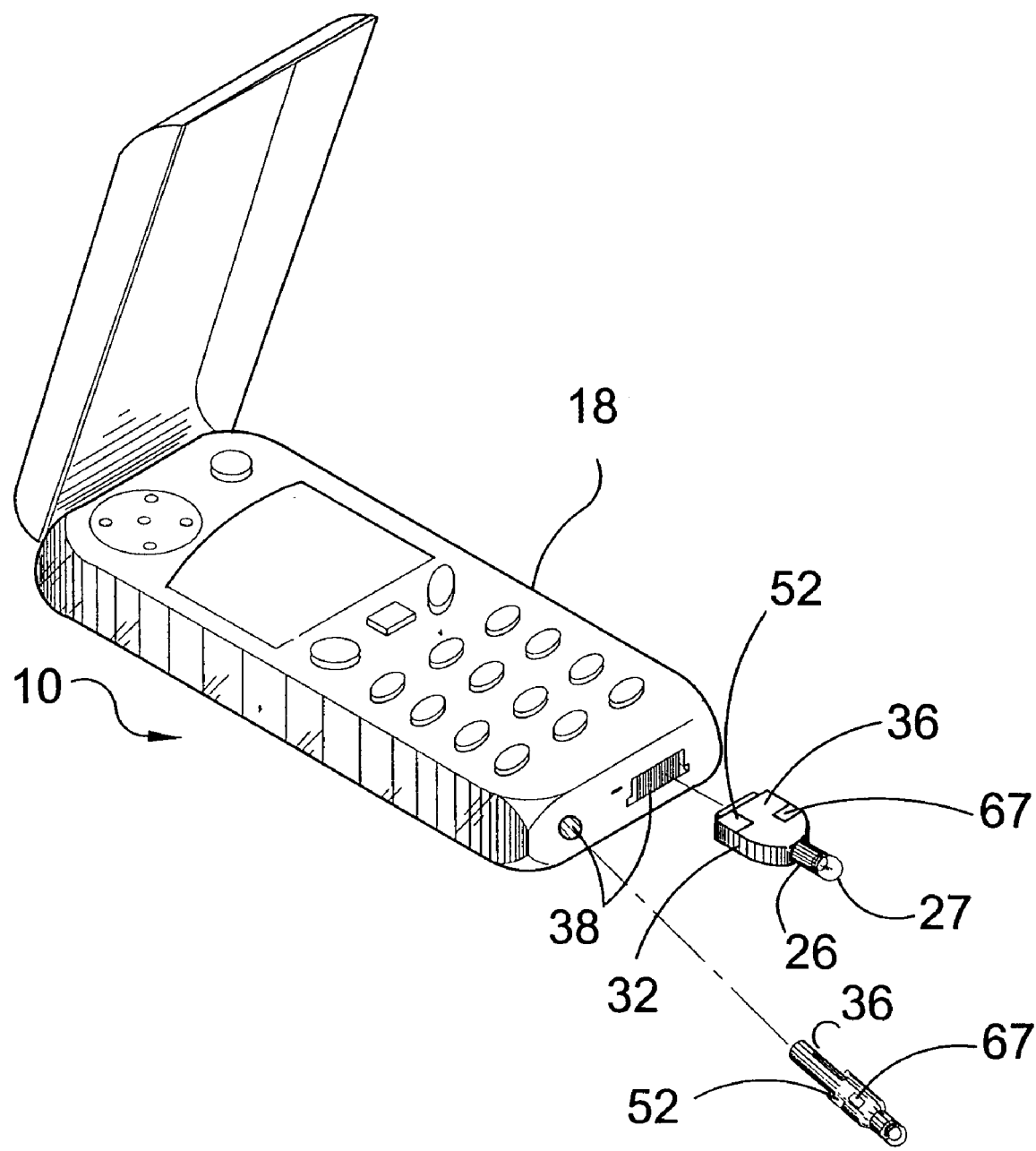
FIG. 18 is a perspective view having a flashlight module for a charging port.

FIG. 18 is a perspective view having a flashlight module for a charging port. Shown is connector 36 that operates off its own battery 67 having switch means 52 for engaging and disengaging said flashlight module that is connected to the cell phone 18 connection port 38.

From the above description it can be seen that the present invention overcomes the shortcomings of the prior art by providing a light unit that can be made integral within the housing of a cellular phone or beeper and a light unit that can be selectively connected to a connection port on a cellular phone for providing light to a dark area. The light unit of the present invention is powered by the power source of the cellular phone, beeper or its own battery supply and is selective activated by a user toggling the on/off switch. Furthermore, the present invention is simple and easy to produce and use.

It will be understood that each of the elements described above, or two or more together may also find a useful application in other types of methods differing from the type described above.

While certain novel features of this invention have been shown and described and are pointed out in the annexed claims, it is not to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed is new and desired to be protected by Letters Patent is set forth in the appended claims:

1. A cellular flashlight comprising:
    a) a cellular phone having a housing and an antenna extending therefrom;
    b) a light mounted on a distal end of said antenna;
    c) a power source for providing power to the cellular phone and said light;
    d) a power switch located on a face of said phone adjacent said antenna connected between said light and said power source, wherein said power switch is movable between a first open position disconnecting said light from said power source and a second closed position connecting said power source to said light, wherein when said power switch is in said second closed position, said light is illuminated to provide light to an area at which said light is directed.

2. The cellular flashlight as recited in claim 1 wherein said housing of said cellular phone further includes a connection port positioned on a side of said housing.

3. The cellular flashlight as recited in claim 2 wherein the light includes a lamp and a bulb connected to said lamp for emitting light therefrom when said power switch is in said second dosed position.

* * * * *